United States Patent [19]

Hasselmann et al.

[11] Patent Number: 4,700,024

[45] Date of Patent: Oct. 13, 1987

[54] SIGNAL AND CURRENT TRANSMISSION SYSTEM WITH TRANSDUCERS SPACED BY THE COLLECTOR LINES

[75] Inventors: Heinz Hasselmann, Hagen; Anton Muenzebrock, Dortmund; Heinz Pfannkuche, Bochum, all of Fed. Rep. of Germany

[73] Assignee: Mannesmann AG, Duesseldorf, Fed. Rep. of Germany

[21] Appl. No.: 740,285

[22] Filed: Jun. 3, 1985

[30] Foreign Application Priority Data

Jun. 2, 1984 [DE] Fed. Rep. of Germany ....... 3420649

[51] Int. Cl.$^4$ .......................... B60L 5/36; B61L 23/00
[52] U.S. Cl. ............................... 191/45 A; 246/122 R
[58] Field of Search ................ 191/23 A, 45 A, 59.1; 246/167 R, 122 R; 104/88

[56] References Cited

U.S. PATENT DOCUMENTS

| | | | |
|---|---|---|---|
| 3,661,089 | 5/1972 | Soltz | 104/88 |
| 3,662,688 | 5/1972 | Desilets et al. | 104/88 |
| 3,751,640 | 8/1973 | Daigle et al. | 104/88 X |
| 4,089,269 | 5/1978 | Shaw | 104/88 |
| 4,155,434 | 5/1979 | Howell, Jr. | 191/49 X |
| 4,416,357 | 11/1983 | Szysh | 191/23 A |

*Primary Examiner*—Robert B. Reeves
*Assistant Examiner*—Scott H. Werny
*Attorney, Agent, or Firm*—Ralf H. Siegemund

[57] ABSTRACT

Control signals are transmitted to and from a vehicle in that stationary transducers are mounted on a parallelogram suspension for a collector line in a particular relation thereto, while a complementary and cooperating transducer is mounted next to a collector shoe on a vehicle, so that the collector line adjustment is used to ensure particular alignment of the transducers when passing.

5 Claims, 2 Drawing Figures

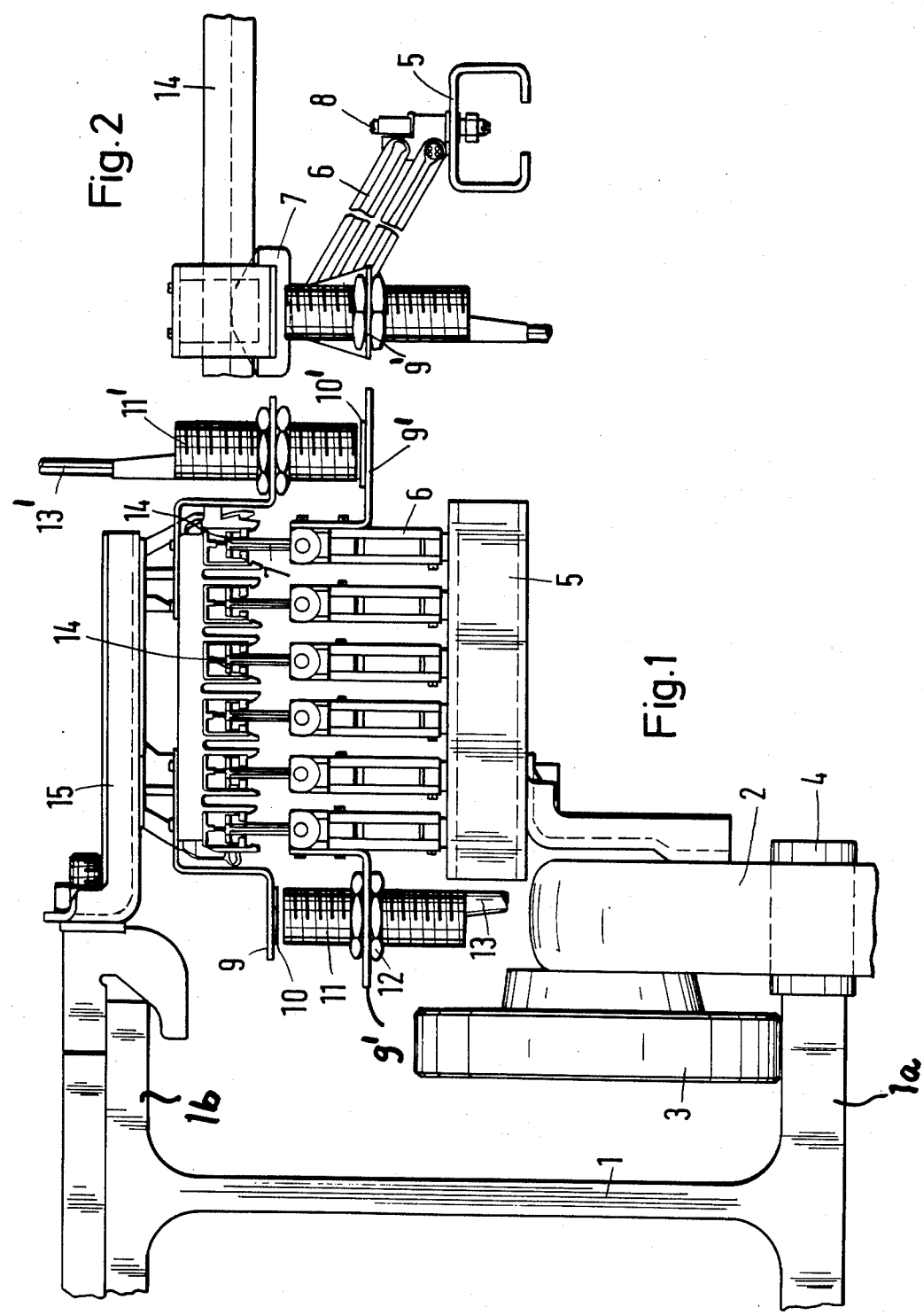

SIGNAL AND CURRENT TRANSMISSION SYSTEM WITH TRANSDUCERS SPACED BY THE COLLECTOR LINES

BACKGROUND OF THE INVENTION

The present invention relates to a system associated with a current conductor line for feeding current consuming devices running as vehicles on rails and having particularly movably disposed current collectors which are to be guided along and for engagement with the current collector lines.

Current collector lines generally are known e.g. through the German printed patent application No. 2,453,754. Modern transport equipment require in addition that the vehicle, for example an overhung trolley, receives information from a central station which generally controls the overall system, and/or to provide to the vehicle information relevant about its position, speed and the like. In the most simple case this information to or from the overhung trolley indicates that the trolley has reached a particular position and the information to the trolley is destined to establish to the drive of the trolley that it has reached that position; information to a central station is analogously indicative. One can also say, that a central station or the trolley, or both want to know when a trolley passes a particular point. Therefore information transfer is to be provided for generally whereby it has to be considered that the vehicles do not necessarily run quitely on the rails but sway back and forth to some extent, and particularly during negotiating curves or passing across switches the guidance of the vehicle on the rails is not necessarily very accurate as far as the lateral position concerned. These tolerances in the engagement between vehicle and rail have to be considered but this must not interfere with the transfer of the signals.

DESCRIPTION OF THE INVENTION

It is an object of the present invention to provide a new and improved signal transmission along current collector line in overhung trolley systems or the like.

In accordance with the preferred embodiment of the present invention it is suggested to provide the current collector line or lines on one hand and at least one of the movable current collectors on the other hand respectively with complementary cooperating components which together establish, preferably a bidirectional signal transmission path and system. The signal transmission system is physically tied to the collector line-collector system; since the latter as a whole is guided for certain engagement so that the current collector itself will positively slide along the collector line without lateral and vehicular path deviation, positive transmission coupling in the transmission system is assured by physically tying the transmission system to the collective system on both the vehicle and the stationary position of the overall system.

In principle the collector-collector line subsystem may be associated with two transmission systems operating separately and each being provided for one way transmission. Conveniently, each transmission system may be composed of one active and one passive component, wherein the passive component provides a specific characterization such as the presence of the vehicle at a particular location possibly with coded identification, while the active component responds and furnishes control signals that evaluate the sensed presence of the passive components.

In the preferred form of practicing the invention it is suggested to provide a signal transmission system that includes initiators i.e., code pickups (active) with information or code plates (passive); magnetic switches or pickups (active) with magnetized plates (passive); electrical switches (active) and contact actuators (passive; light barriers with a reflector (passive) in combination with a light transmitter and light receiver or the like (active); light source (positive), light receiver (active). In each instance the electrically active part or parts of the signal transmission system is connected through a control line either with the central control or the local vehicle control. Depending upon the kind of information transfer the active part can be arranged either on the current line or on the current collector itself, while the passive part is secured to the respective other one of these two basic components. In other words in a dual system, the active part is associated (physically) as well as conceptually with a device that is being controlled or provides control, the passive part is correspondingly associated with that part of the overall system that is to signal to the active part occurrence of a condition. For particular applications and/or particular situations such as light signal transmission it may be of advantage to provide both sides with active components. Generally, a bidirectional transfer may be such that, as the vehicle passes a certain point, it so signals to the stationary portion of the system and the central control of the latter may use the occasion to signal to the vehicle further commands.

For fastening these components angle brackets or the like can be used whereby the active part is preferably adjustable provided in that fashion, these and other structural implementations will be referred to below.

DESCRIPTION OF THE DRAWINGS

While the specification concludes with claims particularly pointing out and distinctly claiming the subject matter whch is regarded as the invention, it is believed that the invention, the objects and features of the invention and further objects, features and advantages thereof will be better understood from the following description taken in conjunction with the accompanying drawings in which:

FIG. 1 illustrates a cross section through a rail and trolley structure with current collecting arrangement supplemented in accordance with the preferred embodiment of the present invention for practising the best mode thereof; and FIG. 2 illustrates a side view showing but a portion of the overall system as shown in FIG. 1.

Proceeding now to the detailed description of the drawings, a rail 1 is shown, basically in the form of an I-beam, and the lower flange 1a thereof is constructed as rail surface proper to be in engagement with wheels such as 3 pertaining to an overhung and suspended trolley; only the suspension structure 2 of that trolley is shown. The trolley is laterally guided with respect to this lower flange by means of rollers 4.

The overhung trolley also has affixed to its suspension structure a mounting plate or bar 5 for supporting spring biased, parallelograms or a parallelopiped like cantilever suspensions 6 having at their end current collectors 7. These cantilever suspension devices 6 are particularly laterally pivotably mounted by means of vertically oriented axial pins 8 so as to be pivotable in the horizontal plane with respect to the mounting plate 5 in addition to the up and down suspension of the collector shoes 7 they provide for cantilever mounting on account of the parallelogram mounting.

These shoes 7 slide on and are guided in collector lines 14 which in turn are suspended stationarily from holders 15. These holders are affixed to the upper flanges 1b of the I beam 1. The collector shoes 7 and the collector lines establish a self guiding system in which the shoes 7 are held in engagemennt with the collector lines 14. Hence this part of the overall trolleyrail system is essentially invariant to lateral trolley movements as it runs on the rail-flange 1a. This lateral invariance is essentially established by (a) the engagement of shoes 7 with line 14 and (b) by the up and down, and left and right adaptability of the shoes on account of the cantilever (6) and lateral pivot (8) mounting. This invariance is used, to establish a positive (physically invariant) transmission link between stationary equipment and trolley at the point or instant of passing.

Reference numeral 9' refers to angle brackets for supporting for example transmission components on the upper end of parallelogram mounts 6. Particularly the mount 6 on the right hand side has mounted to it a bracket 9' which carries a passive element 10' such as a coded plate. The information content of code plate 10' is sensed by a pickup, transducer or initiator 11' which is connected to the stationary central station via a cable 13'.

The left hand mount 6 for one of the collector shoes 7 carries also an angle bracket 9 to which in turn is mounted an initiator transducer or pick-up 11, fastened to bracket 9 by means of a nut 12. A cable 13 leads from the pick-up to a control device in the trolley 2. It can thus be seen that devices 11 and 10' being respectively the active and the passive component for two different transmission links, move with the collector shoes 7 such that they will stay in particular alignment with the stationary conductor line system 14. This fact is utilized by mounting the respective complementary components 10 and 11' to the collector line and their support and suspension system, 14–15 by means of angle brackets 9. If the trolley 2 sways laterally or in any other direction for example during a curve or when passing across a switch it can be seen that the spacing as well as relative lateral position between information or code plates 10, 10' and initiators or pick-ups 11, 11' when passing are not affected, so that indeed the information transfer is guaranteed.

The initiators or pickups 11 (11') can be adjusted as far as positon is concerned, by means of nuts 12 so as to have particular spacing relative to the code plates 10' (10) when passing. The initiators or pick-ups 11 and 11' react to the information plates 10 and 10' whenever they pass and provide the requisite information via control lines 13 and 13' respectively to a central control which is a part of the vehicle and to a stationary control center for the system which controls the various trolleys. The information as transferred this way runs from the vehicle to the central control station and vice-versa so that the motion of the vehicle can be controlled on one hand and its position can be ascertained and signaled on the other hand.

Elements 10 (10') and 11 (11') can also be construed to constitute different transducers which cooperate with each other on passing. These elements can be realized in various ways as was outlined above. The passive transducer may be realized as a switch actuating plunger; a light beam reflector; a light source; a magnetized plate or other code plate. The active transducer may be a switch; a light transmitter/receiver system; just a light detector; a magnetizable element or other code sensing device.

The invention is not limited to the embodiments described above but all changes and modifications thereof, not constituting departures from the spirit and scope of the invention, are intended to be included.

We claim:

1. In a system which includes current collector lines cooperating with current collectors, the lines being stationarily positioned, the current collectors pertaining to a vehicle moving along stationary rails, the improvement comprising:
    a first signal transducing means mounted on the vehicle and being physically juxtaposed to the current collector at a predetermined, fixed spatial relationship;
    a second stationary signal transducing means juxtaposed to the current collector line in a fixed spatial relationship, said first and second transducing means remaining physically separated and spaced from each other but providing for signal transfer between the vehicle and stationary equipment, as the current collector passes across the current collector line pursuant to movement of the vehicle; and
    said collector as well as the first transducing means are mounted to cantilever ends of parallelogram like suspension devices being laterally pivoted to said vehicle for maintaining the collectors in engagement with the line, to thereby establish for the first transducing means and the second transducing means, when passing, a predetermined vertical and horizontal alignment as determined by the spatial relationships between the respected transducing means, and the current collector and collector line.

2. The improvement as in claim 1 wherein one of said first and second transducing means is a passive device while the respective other one being an active device.

3. The improvement as in claim 2 wherein the passive device is a switch actuating plunger, a magnetized plate, a reflector, a light source or a code plate; the active device being a switch, a magnetizable element, a light receiver/transmitter; a light receiver or code pick device.

4. The improvement as in claim 2, and including means for mounting the active part in vertical adjusting position to vary the spacing from the passive part.

5. The improvement as in claim 1, wherein two separate transmission links are provided each link including a passive and an active device, the trolley having one of the active and one of the passive devices, the collector lines having the respective other ones.

* * * * *